United States Patent

[11] 3,582,179

[72] Inventor Narihiko Nakazawa
 Tokyo, Japan
[21] Appl. No. 738,239
[22] Filed June 19, 1968
[45] Patented June 1, 1971
[73] Assignee Nippon Kogaku K.K.
 Tokyo, Japan
[32] Priority June 23, 1967
[33] Japan
[31] 42/39,905

[54] OPTICAL INSTRUMENT WITH STABILIZED REFLECTING COMPONENT MOUNTED AS INVERTED PENDULUM
 1 Claim, 9 Drawing Figs.
[52] U.S. Cl. ................................................. 350/16, 356/250
[51] Int. Cl. ........................................ G02b 23/02, G01c 9/12
[50] Field of Search ............................................. 350/16, 285; 356/250

[56] References Cited
UNITED STATES PATENTS
| 2,779,231 | 2/1957 | Drudofsky | 350/16 |
| 2,981,141 | 4/1961 | Armstrong, et al. | 350/16 |

FOREIGN PATENTS
| 1,386,114 | 12/1964 | France | 350/16 |
| 136,062 | 3/1960 | U.S.S.R. | 356/250 |
| 153,571 | 3/1962 | U.S.S.R. | 356/250 |
| 1,123,429 | 9/1956 | France | 356/250 |

Primary Examiner—David H. Rubin
Attorney—Anton J. Wille

ABSTRACT: A device for magnifying the angle of slope with high stability in a leveling instrument by means of a pendulum system using elastic lines forming a triangle with the instrument body. The correcting mirror or prism is suspended by the elastic lines so that the center of gravity of the suspended mirror or prism is within the sides of the triangle formed by the lines, the elastic character of the elastic lines being utilized for tilting the pendulous mirror thereby removing the shock weakness of conventional pendulous lines.

OPTICAL INSTRUMENT WITH STABILIZED REFLECTING COMPONENT MOUNTED AS INVERTED PENDULUM

The present invention relates to the device for magnifying the angle of slope of the automatic correcting mechanism on an automatically correcting device for automatically correcting the object light path by providing automatically correcting mirror composed of a movable reflecting member or refracting member in the light path between the objective and the focusing plate, or in front of the objective.

As the conventional automatic correcting mechanism, there have been such means for magnifying the angle of slope by making use of elasticity, and the conventional means for magnifying the angle of slope can be classified into a system according to which bending is made use of, and a system according to which twisting is made use of.

The present invention belongs to the system in which bending is utilized, and in this system there are two systems, i.e., suspended pendulum system and erected pendulum system. However, in the pendulum system shown in FIG. 1 (a) and (c), the magnification of the angle of slope cannot be obtained, and therefore in order to attain the magnification of the angle of slope, such a system that make use of the erected pendulum system as is shown in FIG. 1(b) has hitherto been utilized. However, in such an erected pendulum system as such, unstable factors are thought of. In other words, in FIG. 1 (b), it is difficult to obtain the still state when compared with the length $l$ of the span because of the single pendulum. In order to remove the unstability, the length of the span is shortened and the problem can be almost solved, but at the same time the rate of the magnification can be reduced as is well known to those skilled in the art. On the other hand, the center of gravity of the matter is positioned at the top end of the elastic line (or plate) which is erected, and the strength which can resist the simple bending effects and buckling effects, is required, and therefore the movement of relatively higher energy is generated when vibration is generated, and this becomes one of the factors which cause the unstability.

The object of this invention is to provide the device for magnifying the angle of slope of high stability by means of the pendulum system utilizing a plural number of elastic lines for removing the unstable factors as mentioned above.

In accordance with this invention, it is possible to tilt the automatically correcting mirror in the same direction as the direction in which the body is tilted at the angle of slope $\beta$ which is larger than the angle of slope $\alpha$ of the body. In addition to that, the elastic lines are formed in a triangle, and therefore the device of this invention is remarkably stable against the vibration caused by the external force when compared with the conventional devices for magnifying the angle of slope.

This invention is a device for magnifying the angle of slope in an automatically correcting device for automatically correcting the object light path by providing the automatically correcting mirror composed of movable reflecting member or refracting member in the light path between the objective and the focusing plate, or in front of the objective which comprises providing at least three elastic lines for suspending the automatically correcting mirror, fixing one end of each of said elastic lines onto the body, coinciding the other end of each of said elastic lines on the same straight line, fixing the elastic lines on the suspended matter in such a manner that said elastic lines can form a reversed triangle in the same direction in which the automatically correcting mirror is moved, placing the center of gravity of the suspended matter including the automatically correcting mirror at the upper portion of the vertex of the reversed triangle, to the effect that the automatically correcting mirror can be tilted in the same direction as the angle of slope $\alpha$ of the body at a larger angle $\beta$ than the angle of $\alpha$ of the body.

The following is an explanation about the principle of this invention and the embodiment in accordance with the attached diagrams.

Figure 3A:
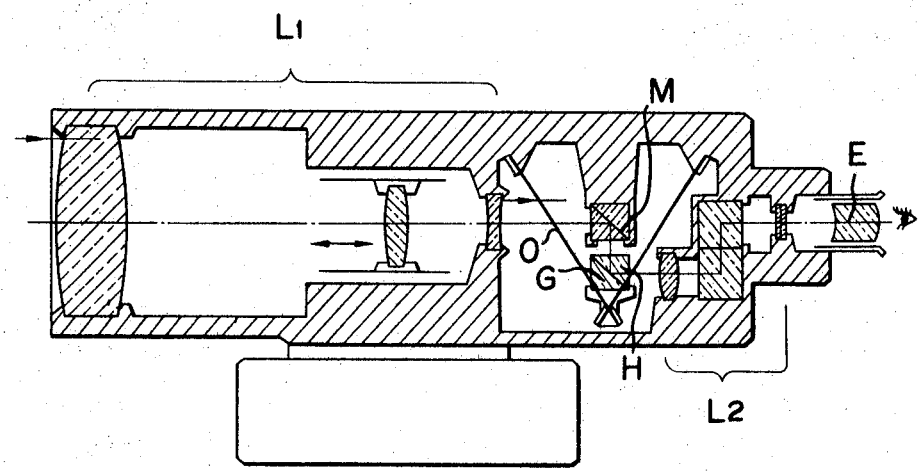
Figure 3B:
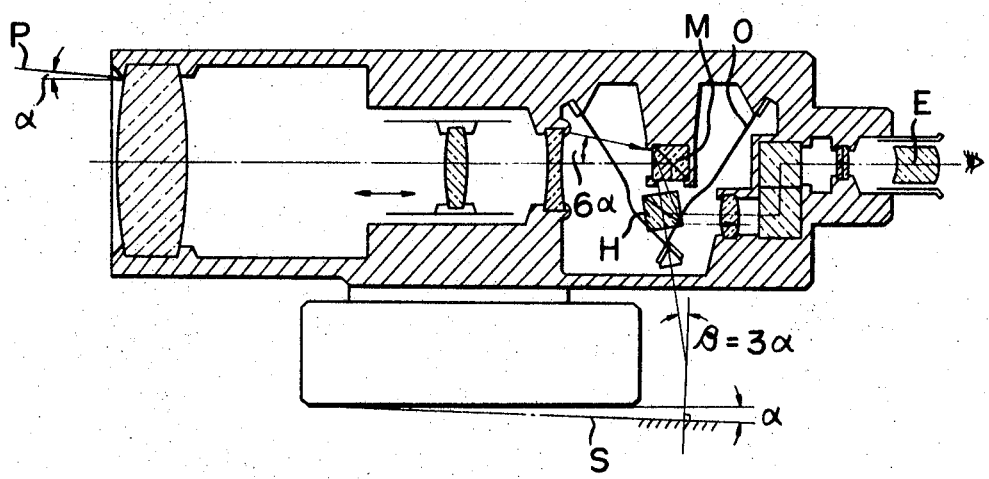
Figure 4:
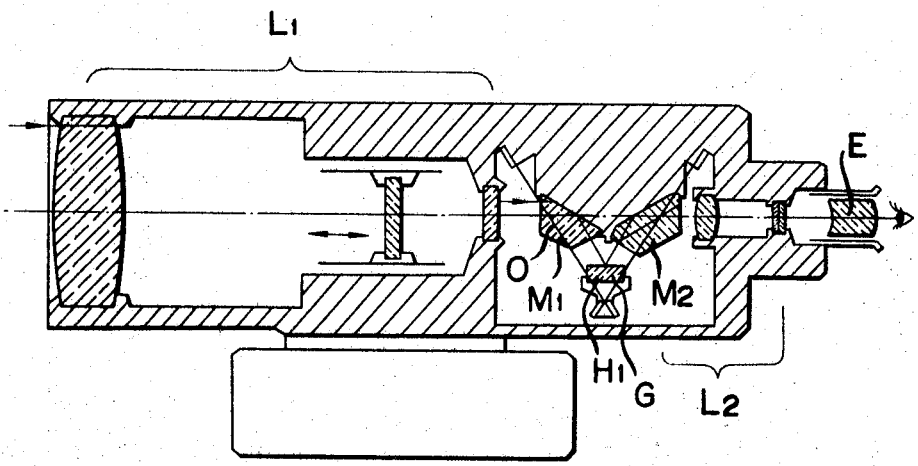

FIG. 3 is a cross-sectional view of a telescope of an autolevel as one of the embodiments of this invention, and (a) shows the case in which the body is horizontal, and (b) is the case in which the body is tilted at the angle $\alpha$ from the horizontal line; and FIG. 4 shows the cross-sectional view of a telescope of an autolevel of another embodiment, and shows the case in which the body is horizontal.

Figure 1A:
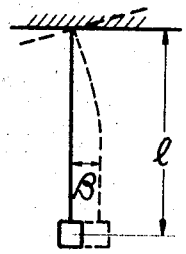
FIG. 1 shows a conventional device for converting angle utilizing elastic lines; (a) and (c) show the suspended pendulum system, and (b) shows erected pendulum system.
Figure 1B:
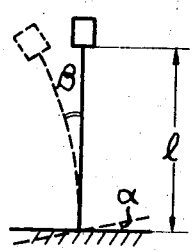
Figure 1C:
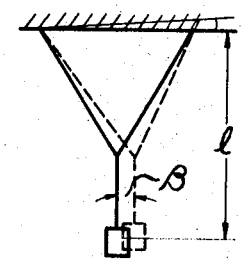
Figure 2A:
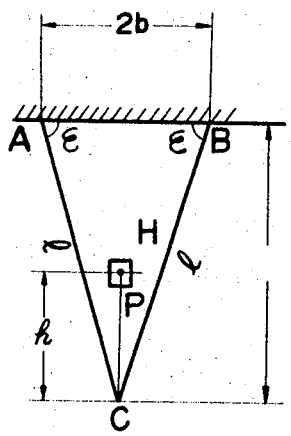
FIG. 2 shows the principle of the mechanism of this invention; (a) shows the case in which the body is horizontal, and (b) shows the case in which the body is slightly tilted, and (c) shows the case in which the body is slightly tilted, and the elastic lines are bent, and balance is taken, and (d) shows the outline of the mechanism.
Figure 2B:
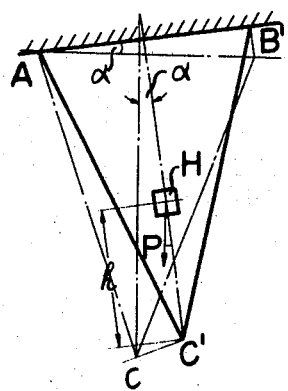
Figure 2C:
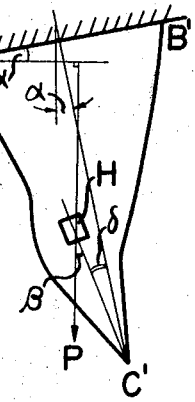
Figure 2D:
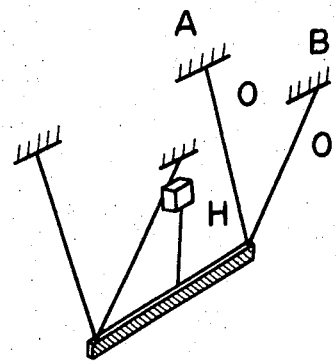
Figure 2D:
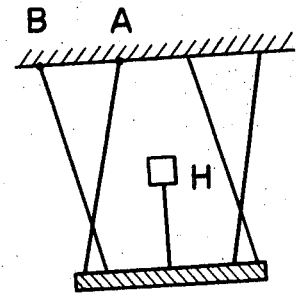

The explanation about FIG. 1 is given in the beginning of the specification.

Referring to FIG. 2; A and B are the points which are fixed on the body, and the elastic lines O (wires or tapes) are crossed at the point C to form an isosceles triangle ACB. The suspended movable matter H is fixed on the elastic lines O at the point C. The height of the center of gravity thereof is set to be $h$, and the weight thereof is set to be $P$.

In FIG. 2 (b), when the body is tilted by the slight angle of $\alpha$ with the point A as the fulcrum, and the point B is moved to the point B', the triangle ACB is moved into the triangle AC'B' directly. Thus, the direction of the gravity is tilted by the angle $\alpha$ on the matter H, and the moment M is generated at the point C'. The elastic lines O are bent by the moment M, and the elastic lines come to a stop as the balance is taken (FIG. 2C). When the angle of slope at this time is set to be $\delta$, the angle magnification rate $v$ can be represented by the following formula. $v=\delta/\alpha$ The elastic modulus of the elastic lines O is set to be E, and the moment of inertia of area is set to be $Iz$, and the length of the lines is set to be $l$ and the distance from the point C to AB surface is set to be $a$, and $\alpha$ is set to be slight angle of slope, and higher order terms are taken into consideration to simplify, the magnification rate of the device of this invention can be represented by the following formula.

Formula:

$$v=\frac{\delta}{\alpha}=\frac{h\left(\sqrt{\frac{Pa}{2EIzl}}-\frac{2}{l}\right)}{\frac{a+2h}{l}-\frac{a}{l^2\sqrt{\frac{Pa}{2EIzl}}}-h\sqrt{\frac{Pa}{2EIzl}}}$$

The magnification rate $v$ is reduced against the increase of $E$ and $Ez$, and it is increased to the increase of $P$ and $h$, and it can be optionally determined by the selection of the respective elements. When the body is tilted by the angle of $\alpha$ from horizontal line (S), the suspended movable matter (H) can be tilted in the same direction by the angle of $\beta=(\alpha+\delta)$. Accordingly, when the respective elements are determined by $v=2$, and the body is tilted by the angle of $-\alpha$, the suspended movable matter (H) can be tilted by the angle $\delta=-2\alpha$, so that the suspended matter (H) can be tilted in the direction of body by the angle of $\beta=(\alpha+2\alpha)=3\alpha$ from the horizontal line (S).

FIG. 3 (a) shows the telescope of an autolevel composed in accordance with the above mentioned principle, and ($L_1$) is the objective of an afocal optical system such as a Galileo telescope, and the magnification thereof is times. Therefore the parallel light which is projected at the angle of $\alpha$ to optical axis is ejected at the angle of $6\alpha$ to the optical axis of the object after having passed the lens ($L_1$); ($L_2$) is a conventional telescope which can form a positive image, and is composed to the effect that the parallel light can form image at the focusing position thereof. (M) is a prism for converting the light path as is fixed on the body, and is faced to the automatically correcting mirror (H) which is described hereinafter. (H) is an automatically correcting mirror suspended in accordance with the principle of this invention, and is composed in such a manner that it can be tilted in the same direction as the direction of the slope of the body at the predetermined angle ratio of ($\beta=3\alpha$). (G) shows the position of the center of gravity of the suspended matter, and (E) is the eyepiece lens.

The device of this invention has the above mentioned structure, and when the body is tilted in the counterclockwise direction by the angle of $\alpha$ from the horizontal line (S) as is shown in FIG. 3 (b), the automatically correcting mirror (H) suspended with four elastic lines (O) forming a triangle stops still by tilting at the angle of $3\alpha$ in the same direction.

Therefore the horizontal light (P) coming into the objective ($L_1$) in the above described state goes towards the automatically correcting mirror H through the reflecting mirror M by forming the angle of slope $6\alpha$ to the light axis of the object, and becomes the light in parallel with the light axis of the objective $L_1$, and enters the next telescope, and forms the image at the predetermined position. Namely, the horizontal light P having entered the objective $L_1$ forms the image at a predetermined position of the focusing plate always regardless of the slope of the body.

FIG. 4 shows another embodiment of the telescope of the autolevel constructed in accordance with the principle of this invention, and the magnification and the composite lens group are the same as in the case of FIG. 3 (a), and shows an embodiment in which the prism system of the correcting mechanism portion is converted. The reflecting surfaces of prisms $M_1$ and $M_2$ are fixed on the body for converting the light path, and are faced to the automatically correcting mirror $H_1$. The first prism $M_1$ converts the incident light flux and the second prism $M_2$ is a roof edge prism for converting the light flux from $H_1$. $H_1$ is an automatically correcting mirror which is suspended in accordance with the above described principle, and is tilted in the same direction as the direction of the slope of the body at the predetermined angle ratio. Other notations are the same as in the case of FIG. 3(a).

I claim:
1. An automatic leveling instrument for sighting objects along a level optical line of sight, comprising a housing, a sighting optical system provided in said housing and including an objective, a reticule and an eyepiece, a reflecting optical system provided in the light path between said objective and said reticule and including a first reflecting optical component fixedly mounted in said housing and a second reflecting optical component movably related to said first reflecting optical component for bending the line of sight, and means for mounting said second reflecting optical component as an inverted pendulum body comprising a transverse support member defining an effective axis of rotation for the inverted pendulum body perpendicular to the vertical plane containing the optical line of sight, a pair of elastic deformable threads attached to each end of said transverse support member on said axis of rotation, each pair of threads forming a triangular suspension with the upper ends attached to spaced points on said housing, said second reflecting optical component being mounted on said transverse support member in upwardly spaced relationship to said axis of rotation and the center of gravity of the inverted pendulum body lying between said axis of rotation and said spaced attachment points on said housing, whereby angular tilting of said housing produces a magnified angle of tilt of said second reflecting optical element in the same direction, controlled by the bending deformation of said pairs of threads.